United States Patent
Evans et al.

(10) Patent No.: US 10,401,639 B2
(45) Date of Patent: Sep. 3, 2019

(54) METHOD AND APPARATUS FOR AN OPTICAL PATH LENGTH EXTENDER

(71) Applicant: Avegant Corp., Belmont, CA (US)

(72) Inventors: Allan Thomas Evans, San Francisco, CA (US); Andrew John Gross, Redwood City, CA (US); D. Scott Dewald, Dallas, TX (US)

(73) Assignee: Avegant Corp., San Mateo, CA (US)

( * ) Notice: Subject to any disclaimer, the term of this patent is extended or adjusted under 35 U.S.C. 154(b) by 75 days.

(21) Appl. No.: 15/358,040

(22) Filed: Nov. 21, 2016

(65) Prior Publication Data

US 2018/0045973 A1    Feb. 15, 2018

Related U.S. Application Data

(63) Continuation-in-part of application No. 15/236,101, filed on Aug. 12, 2016.

(51) Int. Cl.
| | |
|---|---|
| *G02F 1/03* | (2006.01) |
| *G02F 1/07* | (2006.01) |
| *G02B 27/28* | (2006.01) |
| *G02F 1/01* | (2006.01) |
| *G02B 5/30* | (2006.01) |

(52) U.S. Cl.
CPC ......... *G02B 27/283* (2013.01); *G02B 5/3058* (2013.01); *G02B 5/3083* (2013.01); *G02B 27/286* (2013.01); *G02F 1/0136* (2013.01); *G02F 2201/17* (2013.01)

(58) Field of Classification Search
CPC .... G03B 35/18; G03B 35/26; G03B 21/2073; H04N 9/3105; H04N 9/315; G02F 1/0136; G02F 1/01; G02F 1/13363; G02C 7/101; G02C 7/12; G02B 27/017; G02B 26/001;
(Continued)

(56) References Cited

U.S. PATENT DOCUMENTS

| | | | |
|---|---|---|---|
| 3,586,416 A | 6/1971 | Bitetto | |
| 3,856,407 A | 12/1974 | Takeda et al. | |

(Continued)

FOREIGN PATENT DOCUMENTS

| | | |
|---|---|---|
| WO | 2012104839 A1 | 8/2012 |
| WO | 2012175939 A1 | 12/2012 |

(Continued)

OTHER PUBLICATIONS

Matjasec et al., "All-Optical Thermos-Optical Path Length Modulation based on the Vanadium-Doped Fibers," Optical Society of America, vol. 21, No. 10, May 2013, pp. 1-14.

(Continued)

*Primary Examiner* — William R Alexander
*Assistant Examiner* — Tamara Y. Washington
(74) *Attorney, Agent, or Firm* — HIPLegal LLP; Judith Szepesi (57) ABSTRACT

A system to adjust light path length using a digital light path length modulator. The digital light path modulator includes an optical path length extender (OPLE) and a polarization modulator. The OPLE has two light paths having different path lengths, so light with a first polarization is directed through a first light path, and the light with a second polarization is directed through a second light path through the OPLE.

19 Claims, 12 Drawing Sheets

(58) Field of Classification Search
CPC .. G02B 26/0841; G02B 26/02; G09G 3/3466; G09G 3/2074
USPC .................................................. 359/298–304
See application file for complete search history.

(56) References Cited

U.S. PATENT DOCUMENTS

| | | | |
|---|---|---|---|
| 4,670,744 | A | 6/1987 | Buzak |
| 5,610,765 | A | 3/1997 | Colucci |
| 5,751,243 | A | 5/1998 | Turpin |
| 6,515,801 | B1 | 2/2003 | Shimizu |
| 6,580,078 | B1 | 6/2003 | O'callaghan et al. |
| 7,360,899 | B2 | 4/2008 | Mcguire, Jr. et al. |
| 7,905,600 | B2 | 3/2011 | Facius et al. |
| 8,262,234 | B2 | 9/2012 | Watanabe |
| 8,755,113 | B2 | 6/2014 | Gardner et al. |
| 9,025,067 | B2 | 5/2015 | Gray et al. |
| 9,304,319 | B2 | 4/2016 | Bar-Zeev et al. |
| 9,494,805 | B2 | 11/2016 | Ward et al. |
| 9,588,270 | B2 | 3/2017 | Merrill et al. |
| 2002/0191300 | A1 | 12/2002 | Neil |
| 2003/0020925 | A1 | 1/2003 | Patel et al. |
| 2004/0156134 | A1 | 8/2004 | Furuki et al. |
| 2004/0263806 | A1 | 12/2004 | Silverstein et al. |
| 2005/0141076 | A1 | 6/2005 | Bausenwein et al. |
| 2006/0119951 | A1 | 6/2006 | McGuire |
| 2007/0030456 | A1 | 2/2007 | Duncan et al. |
| 2007/0030543 | A1 | 2/2007 | Javidi et al. |
| 2007/0139760 | A1 | 6/2007 | Baker et al. |
| 2007/0146638 | A1 | 6/2007 | Ma et al. |
| 2008/0130887 | A1 | 6/2008 | Harvey et al. |
| 2008/0174741 | A1 | 7/2008 | Yanagisawa et al. |
| 2009/0061505 | A1 | 3/2009 | Hong et al. |
| 2009/0061526 | A1 | 3/2009 | Hong et al. |
| 2009/0237785 | A1 | 9/2009 | Bloom |
| 2009/0244355 | A1 | 10/2009 | Horie |
| 2011/0032436 | A1 | 2/2011 | Shimizu et al. |
| 2011/0149245 | A1 | 6/2011 | Barth et al. |
| 2012/0075588 | A1 | 3/2012 | Suga |
| 2013/0070338 | A1 | 3/2013 | Gupta et al. |
| 2013/0100376 | A1 | 4/2013 | Sawado |
| 2013/0222770 | A1 | 8/2013 | Tomiyama |
| 2013/0344445 | A1 | 12/2013 | Clube et al. |
| 2014/0168035 | A1 | 6/2014 | Luebke et al. |
| 2014/0176818 | A1* | 6/2014 | Watson ................ G02B 27/283 349/9 |
| 2015/0061976 | A1 | 3/2015 | Ferri |
| 2015/0205126 | A1 | 7/2015 | Schowengerdt |
| 2015/0319342 | A1 | 11/2015 | Schowengerdt |
| 2016/0041390 | A1 | 2/2016 | Poon et al. |
| 2016/0041401 | A1 | 2/2016 | Suga |
| 2016/0077338 | A1 | 3/2016 | Robbins et al. |
| 2016/0131920 | A1 | 5/2016 | Cook |
| 2016/0195718 | A1 | 7/2016 | Evans |
| 2016/0225337 | A1 | 8/2016 | Ek et al. |
| 2016/0227195 | A1 | 8/2016 | Venkataraman et al. |
| 2016/0381352 | A1 | 12/2016 | Palmer |
| 2017/0038579 | A1 | 2/2017 | Yeoh et al. |
| 2017/0068103 | A1 | 3/2017 | Huang et al. |
| 2017/0075126 | A1 | 3/2017 | Carls et al. |
| 2017/0097507 | A1 | 4/2017 | Yeoh et al. |
| 2017/0146803 | A1* | 5/2017 | Kishigami ............... G02B 5/30 |
| 2017/0160518 | A1 | 6/2017 | Lanman et al. |
| 2018/0045973 | A1 | 2/2018 | Evans et al. |
| 2018/0045974 | A1 | 2/2018 | Eash et al. |
| 2018/0045984 | A1 | 2/2018 | Evans et al. |
| 2018/0149862 | A1 | 5/2018 | Kessler et al. |

FOREIGN PATENT DOCUMENTS

| | | |
|---|---|---|
| WO | 2015190157 A1 | 12/2015 |
| WO | 2016087393 A1 | 6/2016 |

OTHER PUBLICATIONS

Sandner et al., "Translatory MEMS Actuators for optical path length modulation in miniaturized Fourier-Transform Infrared spectrometers," MEMS MOEMS 7(2), Apr.-Jun. 2008 pp. 1-11.

Hu, Xinda et al., "High-resolution optical see-through multi-focal-plane head-mounted display using freeform optics," Opt. Express 22, 13896-13903 (2014).

Lee, Yun-Han et al., Switchable Lens for 3D Display, Augmented Reality and Virtual Reality. Society for Information Display (SID), International Symposium Digest of Technical Papers, vol. 47, Issue 1, May 25, 2016 (4 page).

Pate, Michael, Polarization Conversion Systems for Digital Projectors, Web Publication, Apr. 21, 2006, Downloaded from http://www.zemax.com/os/resources/learn/knowledgebase/polarization-conversion-systems-for-digital-projectors on Jun. 17, 2016 (8 pages).

PCT Written Opinion PCT/US2017/046648, dated Nov. 17, 20017, 14 pages.

PCT Search Report PCT/US2017/046648, dated Nov. 17, 20017, 3 pages.

Polatechno Co., Ltd., LCD Projector Components, http://www.polatechno.co.jp/english/products/projector.html downloaded Jun. 17, 2016 (2 pages).

* cited by examiner

OPLE Type #1

Fig. 2D

OPLE Type #2

C1: Circular Polarized Light Type 1
C2: Circular Polarized Light Type 2
L1: Linear Polarized Light Type 1
L2: Linear Polarized Light Type 2

METHOD AND APPARATUS FOR AN OPTICAL PATH LENGTH EXTENDER

RELATED APPLICATIONS

The present application claims priority to U.S. patent application Ser. No. 15/236,101, filed on Aug. 12, 2016, which is incorporated herein in its entirety.

FIELD

The present invention relates to optics, and more particularly to extending light paths.

BACKGROUND

Providing multiple focal planes, or discrete steps of focus adjustment, is useful for a number of applications. It can be part of creating a more realistic three dimensional display, as well as the ability to capture three dimensional data. In the prior art, multiple focus capture utilized mechanical movement such as gears or liquid lenses. Such mechanisms are expensive, slow, and relatively fragile. Another prior art method of capturing multiple focal lengths uses multiple mirrors and lenses. This is like having multiple cameras; it is bulky and expensive. Because of the bulk and expense, it also limits the number of focal lengths that can be simultaneously captured. A large beam splitter has also been used in the prior art to create two light path lengths. However, this is also a bulky solution.

Such prior art solutions are some combination of large, expensive, and slow. Liquid lenses are expensive and slow, and large beam splitters are large. This makes them difficult to use, and not useful for size or cost constrained systems, particularly portable or worn devices.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

A digital light path length modulator is described. The digital light path length modulator includes an optical path length extender (OPLE) and a polarization modulator, and can be used to adjust the path length of light. In one embodiment, light with state 1 polarization travels through a longer path in the OPLE than light with state 2 polarization. This can be used to create two focal planes. In one embodiment, an OPLE is made up of a partially reflective coating, a quarter wave plate, and a wire grid polarizer. In one embodiment, the OPLE may be made up of one or more plates with a plurality of polarization sensitive reflective elements. A plurality of digital light path length modulators create a modulation stack.

In one embodiment, using a modulation stack the number of focal planes can be increased. This provides the capacity to build a system that can meet the physiological requirements of human vision, by creating display in which the 3D indicia of overlap, focus, and vergence match. This produces a better quality 3D display and can prevent the headaches associated with 3D displays.

This mechanism in one embodiment can also be used for image capture, and various other uses in which light waves or other waves in a similar spectrum are either projected or captured, including but not limited to cameras, binoculars, 3D printing, lithography, medical imaging, etc. Creating a simple, easy to manufacture digital light path length modulator is like the step from vacuum tubes to transistors; it enables more complex, cheaper, and much more dense digitally controlled elements, which can become building blocks for a wide range of uses.

The following detailed description of embodiments of the invention makes reference to the accompanying drawings in which like references indicate similar elements, showing by way of illustration specific embodiments of practicing the invention. Description of these embodiments is in sufficient detail to enable those skilled in the art to practice the invention. One skilled in the art understands that other embodiments may be utilized and that logical, mechanical, electrical, functional and other changes may be made without departing from the scope of the present invention. The following detailed description is, therefore, not to be taken in a limiting sense, and the scope of the present invention is defined only by the appended claims.

Figure 1A:
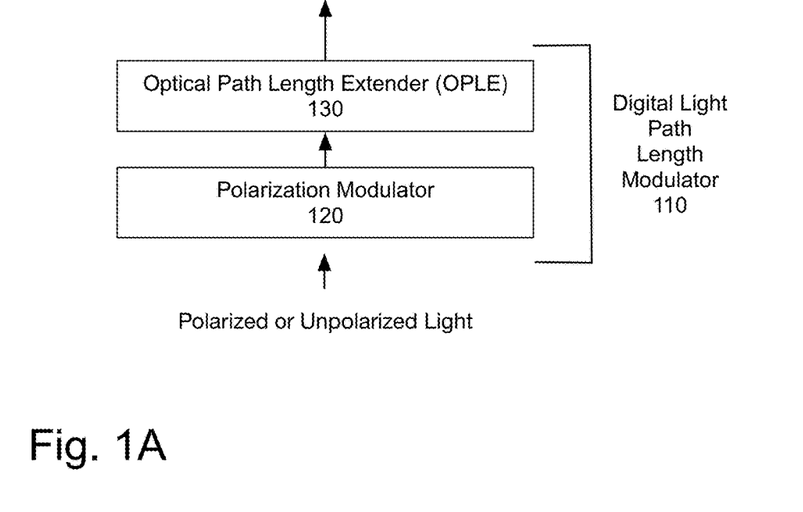
FIG. 1A is a block diagram of one embodiment of a digital light path length modulator.

FIG. 1A is a block diagram of one embodiment of the digital light path length modulator. The digital light path length modulator 110, includes an optical path length extender (OPLE) 130 and a polarization modulator 120. The polarized or unpolarized light impacts the polarization modulator 120. The polarization modulator 120 may rotate polarization, leave the polarization unchanged, and/or filter the light. The output of the polarization modulator 120 enters the OPLE 130. In one embodiment, the polarization modulator 120 is digital, thus providing a digital control to select light path length by turning on and off the polarization modulator 120. In one embodiment, the switching speed of the polarization modulator 120 is adjustable, and switching speed may be under 50 milliseconds. The combination of the polarization modulator 120 and OPLE 130 enables the digital light path length modulator 110 to selectively lengthen the light path.

Figure 1B:
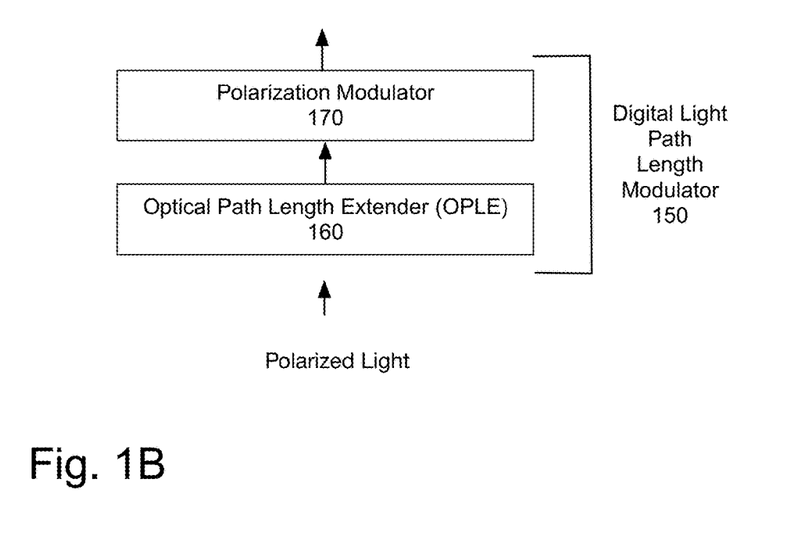
FIG. 1B is a block diagram of one embodiment of a digital light path length modulator.

FIG. 1B is a block diagram of one embodiment of the digital light path length modulator. The digital light path length modulator 150 includes an OPLE 160 and a polarization modulator 170. In this instance, the polarization modulator 170 is placed after the OPLE 160. The polarization modulator 170 can act as a filter, to remove a portion of the light. Either configuration of the digital light path length modulator, shown in FIG. 1A or 1B may be utilized. In one embodiment, a digital light path length modulator may include a polarization modulator on both sides of the OPLE.

Figure 2A:
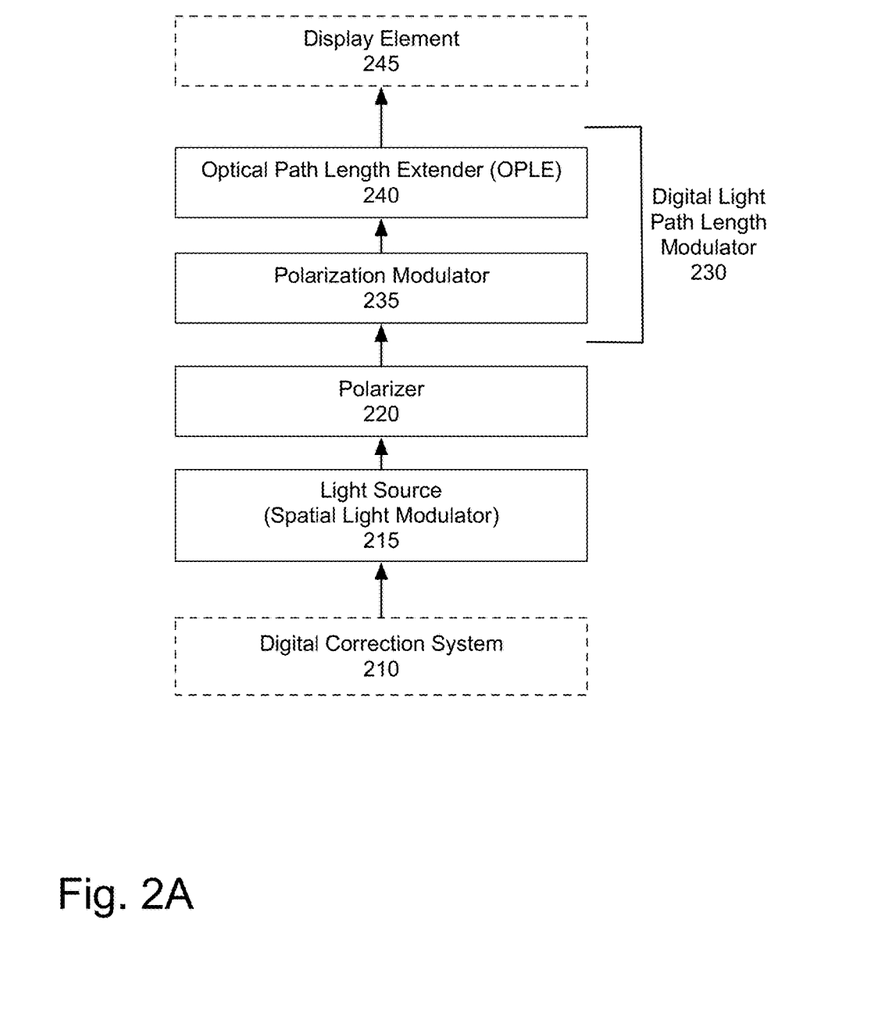
FIG. 2A is a block diagram of one embodiment of a system in which the digital light path length modulator may be used.

FIG. 2A is a block diagram of one embodiment of a system in which the digital light path length modulator may be used. The system is for display. The light source 215 provides the light for display. The light source 215 may be a spatial light modulator.

In one embodiment, there may be a digital correction system 210, which adjusts the output of the light source to compensate for the predicted difference in the location of light of different polarizations coming out of the digital light path length modulator 230. By pre-adjusting the light, the resulting light regardless of its path length is properly positioned when it is displayed.

The digital correction system 210 in one embodiment changes the brightness of the light having a particular polarization through the digital light path length modulator 230, to correct for the loss of brightness due to the OPLE. The digital correction system 210 in one embodiment spatially shifts the image elements entering the digital light path length modulator 230 which may be shifted by the digital light path length modulator 230, to place them in the correct location upon exit from the digital light path length modulator 230.

The corrections from digital correction system 210 may include brightness, lateral shift, and correction for other artifacts of the system. Such pre-calculation of the output of a digital display system is known in the art. Digital correction systems 210 are utilized to correct for lens warping, color separation, and other issues. The digital correction system 210 creates an output which is in the "rendering state" such that the perceived image by the user is correct.

In one embodiment, the optical path length extender (OPLE) 240 may not produce any spatial shift between the light that travels the longer and the shorter path through the OPLE 240. In one embodiment, the OPLE 240 may produce a spatial shift or may be set to an intentional spatial shift.

In the embodiment of FIG. 2A, the light from light source 215 is polarized by polarizer 220. The polarizer 220 may be eliminated if the light source 215 outputs polarized light, or may be integrated into the light source 215. The output of the polarizer 220 is light with one polarization.

The digital light path length modulator 230 includes a polarization modulator 235 and an OPLE 240. The polarization modulator 235, in one embodiment, is an electronically controlled element which can rotate the polarization of beams of light between two orthogonal states, state 1 and state 2, by selectively modulating the polarization of some or all of the light. In one embodiment, the orthogonal states are clockwise and counterclockwise circularly polarized light. In one embodiment, the two orthogonal states are S-polarized and P-polarized linearly polarized light. The polarization modulator 235 may also be a filter which selectively filters light.

In one embodiment, the polarization modulator 235 is an electronically controlled liquid crystal device (LCD). In another embodiment, the polarization modulator may be a Faraday modulator, a switchable birefringent crystal (i.e. LiNO3), or another modulator, which can selectively modulate a portion or all of the light impacting it. In one embodiment, the polarization modulator 235 may selectively polarize the light based on other factors, such as color, wavelength, etc.

The polarization modulator 235 may modulate a subset of the light that impacts it, in one embodiment. In another embodiment, the polarization modulator 235 may modulate all of the light, and switch modulation in time sequential slices. Time sequential slices means that light impacting at time T is not modulated, while light impacting at T+x is modulated. Because the image perceived by a human user is constructed of a series of time sequential slices of data, in one embodiment, these slices are perceived as components of a single image. This is referred to as "biological real time," which is perceived as being concurrent by a human viewer, even though it is time sequential in processing.

The polarized or selectively polarized light impacts the OPLE 240. The OPLE 240 reflects light having a first polarization, and passes through light with a second polarization. The reflected light bounces, before exiting the OPLE 240. This increases the path length of the light having the first polarization, compared to the light having the second polarization which passes directly through the OPLE 240. In one embodiment, the light exits the OPLE 240 at the same angle that it entered the OPLE 240.

Use of this system alters the relative light path length of the light with the two polarizations, because the light with a first polarization travels through a longer path than the light with the second polarization.

Utilizing a plurality of digital light path length modulators 230 allows for a multitude of digitally selectable path lengths. Having the various selectable path lengths enables the creation of multiple focal lengths of light exiting the digital light path length modulator 230, since the light appears to be at different distances from the user, based on the length of the light path. In one embodiment, image elements formed by the light that has a longer light path appear further from a user.

In one embodiment, light exiting the OPLE 240 is not spatially shifted, or intentionally spatially shifted, regardless of polarization. The specific configurations of an OPLE 240, and its manufacture, is discussed in more detail below.

The OPLE 240 and polarization modulator 235 make up the digital light path length modulator 230. A digital light path length modulator 230 creates two or more light path lengths. Although only a single digital light path length modulator 230 is shown in FIG. 2A, the system may include a modulation stack with a plurality of digital light path length modulators 230, to create an increasing number of light path lengths. This may be used to create more focal planes, to create a perception of a hologram. The system thus provides slices of a hologram at two or more focal planes. As the number of focal planes is increased, the output provides 3D cues that approach the limits of human perception. By utilizing a number of focal planes perceived by a user, the perception or recording of a digital hologram can be created.

The output of the digital light path length modulator 230 is displayed via display element 245, or through some other means. The display element 245 may provide a component for a three-dimensional display, with image elements displayed in different focal planes.

Figure 2B:
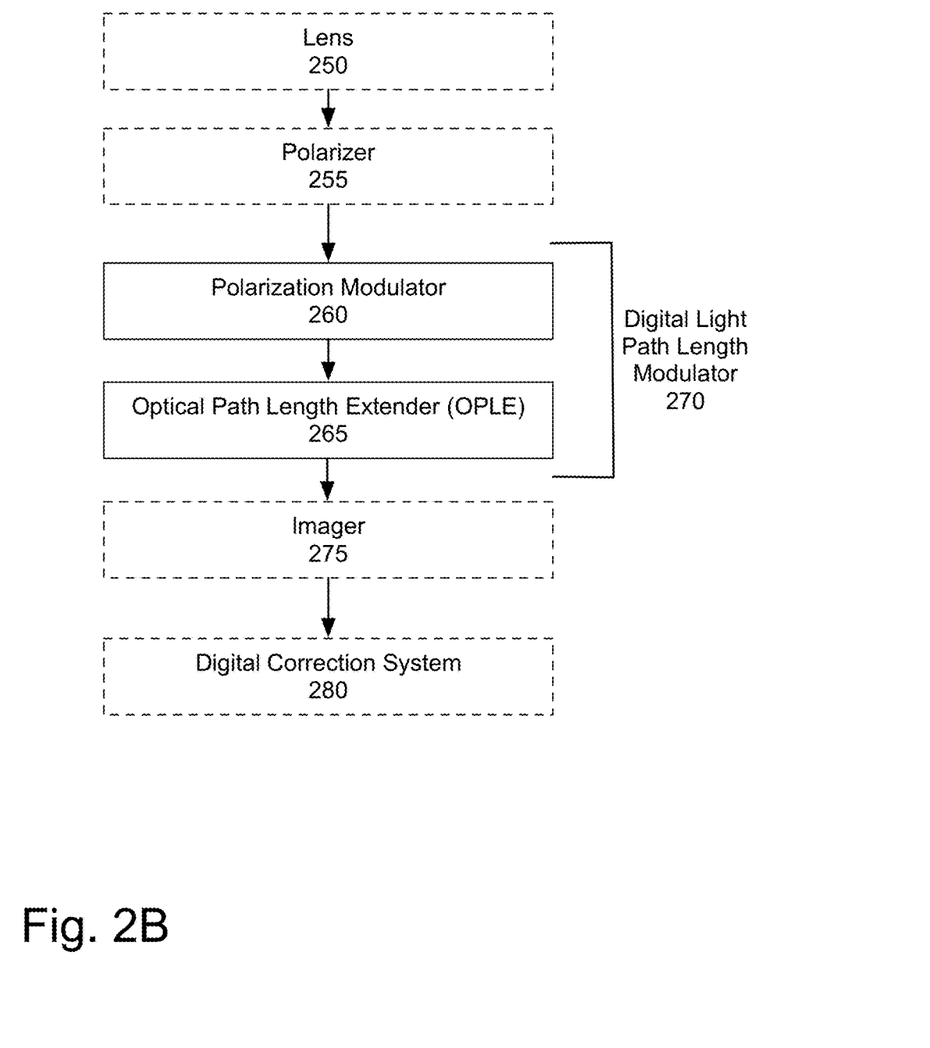
FIG. 2B is a block diagram of another embodiment of a system in which the digital light path length modulator may be used.

FIG. 2B is a block diagram of another embodiment of the system in which the digital light path length modulator may be used. In this embodiment, rather than displaying light/images/data, the system captures light/images/data. In one embodiment, the initial image or data enters a lens 250. Polarizer 255 polarizes the light, if it is not already polarized when it is captured.

The polarized light is then selectively modulated by polarization modulator 260, and passed through OPLE 265. As noted above, within the OPLE 265, the differently polarized light has different path lengths. In one embodiment, a portion of light may be polarized so that a portion of an image embodied in the light goes through a longer light path than another portion. In one embodiment, all of the light may have the same polarization, and the changes in polarization and thus focal length may be varied in time sequential slices. In one embodiment, the system may combine concurrent and time-based light path adjustment.

Imager 275 captures or displays the image. The imager 275 may be an electronic image sensor, such as a charge coupled device (CCD) or a complementary metal oxide semiconductor (CMOS) sensor. The imager 275 may be another capture element, such as film, binoculars, scope, or any mechanism to capture or display an image. In one embodiment, a digital correction system 280 may be used to correct the captured or displayed image to account for differences in brightness/light level or spatial shift between the light beams, because of the path they took.

The OPLE 265 and polarization modulator 260 together form a digital light path length modulator 270. In one embodiment, although only a single digital light path length modulator 270 is shown, the system may include a modulation stack with a plurality of digital light path length modulators 270.

Figure 2C:
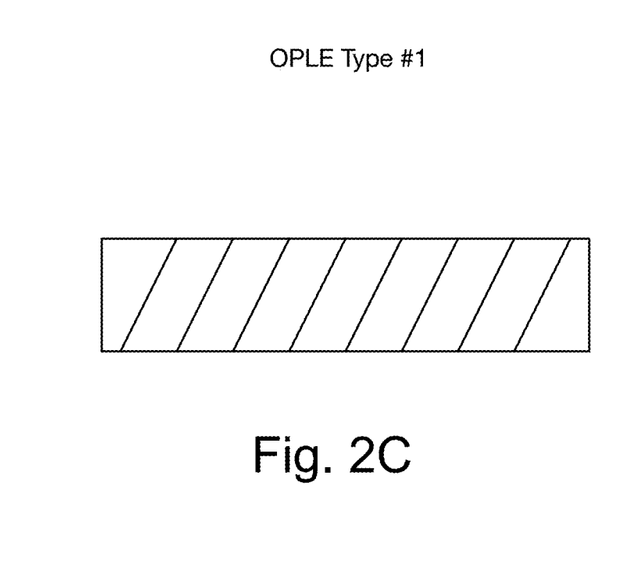
FIG. 2C is a diagram of one embodiment of a first type of OPLE.

FIG. 2C is a diagram of one embodiment of a first type of OPLE, referred to as a transverse OPLE. The OPLE includes one or more plates, each plate having a plurality of polarization sensitive reflective elements, which reflect light having a first polarization, and pass through light with a second polarization. The reflected light bounces between the polarization sensitive reflective elements two or more times, before exiting the OPLE. This increases the path length of the light having the first polarization, compared to the light having the second polarization which passes directly through the transverse OPLE. Further details on the OPLE of FIG. 2C are discussed in co-pending U.S. patent application Ser. No. 15/236,101, filed on Aug. 12, 2016, which is incorporated herein in its entirety.

Figure 2D:
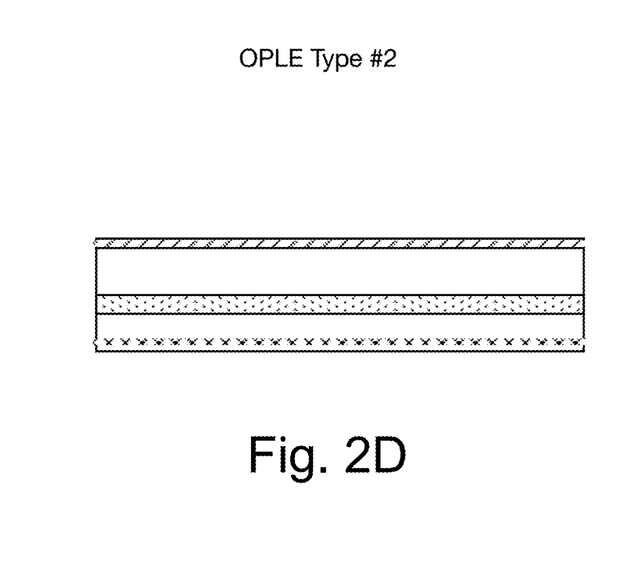
FIG. 2D is a diagram of one embodiment of a second type of OPLE.

FIG. 2D is a diagram of one embodiment of a second type of OPLE, referred to as a longitudinal OPLE. The OPLE includes a reflective element on the bottom surface, which reflects light having a first polarization. The light in turn bounces back from the top of the OPLE, before exiting the OPLE through the bottom surface. This increases the path length of the light having the first polarization, compared to the light having the second polarization which passes directly through the longitudinal OPLE.

Figure 3A:
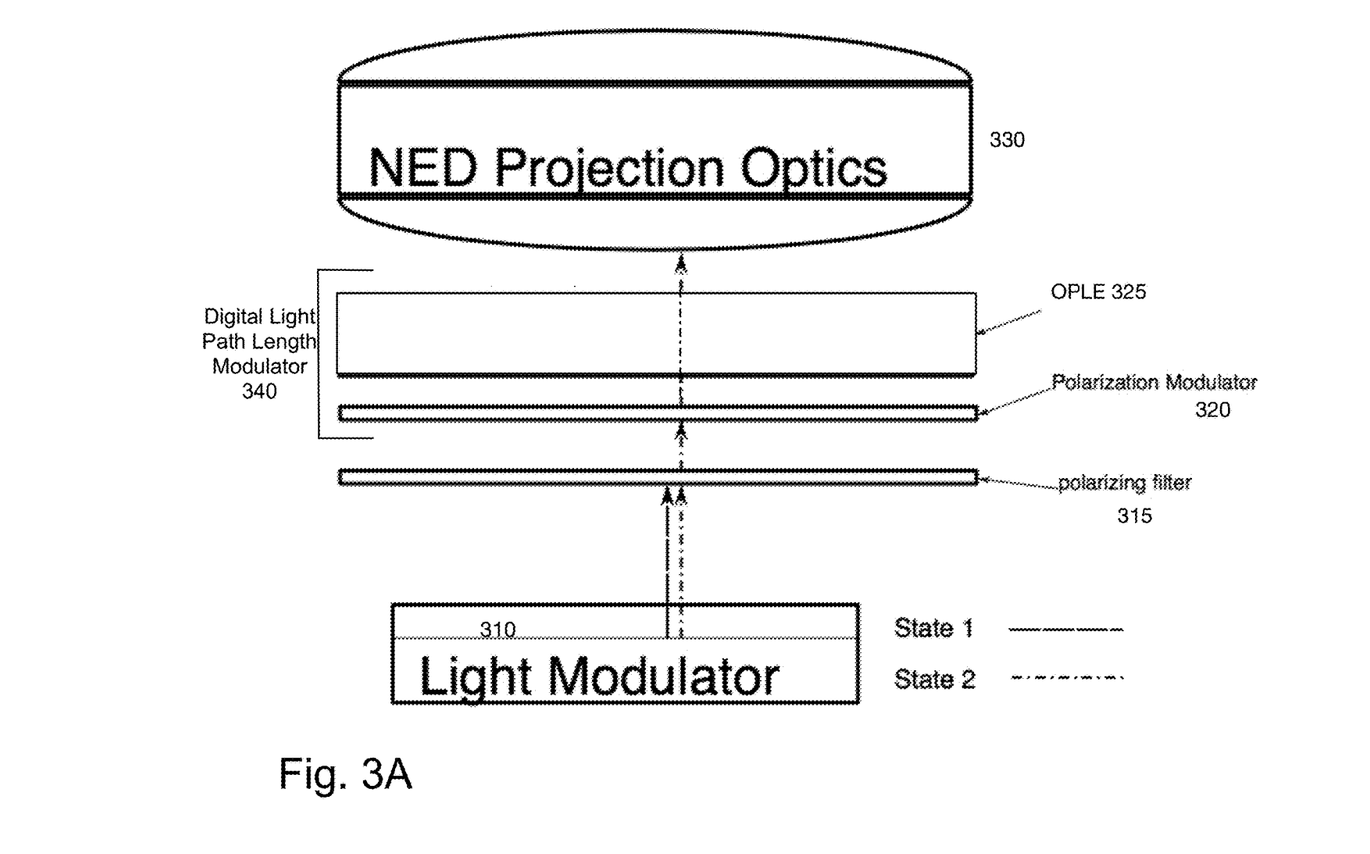
FIGS. 3A and 3B are diagrams of one embodiment of a digital light path length modulator in a near eye display (NED) system.
Figure 3B:
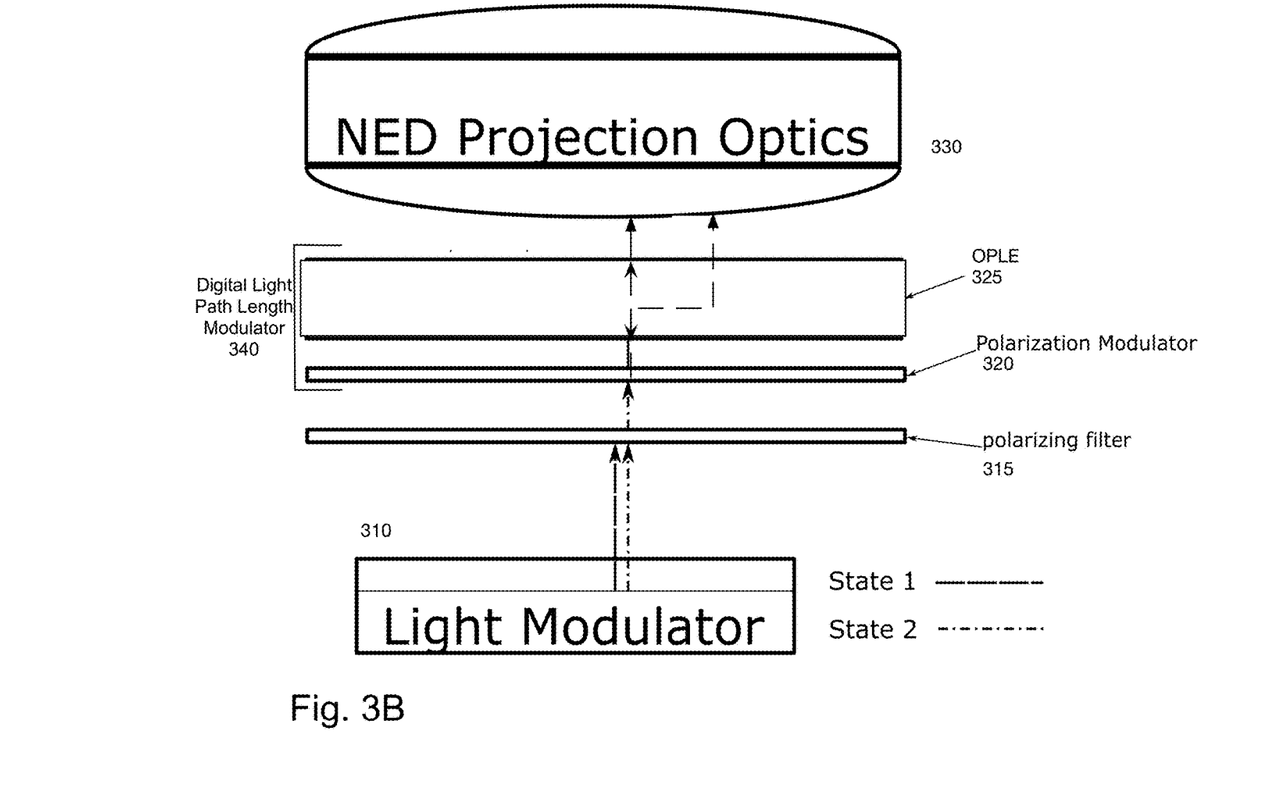

FIGS. 3A and 3B are diagrams of one embodiment of a digital light path length modulator in a near eye display (NED) system. The light modulator 310 outputs polarized light, both state 1 and state 2 polarized light, in one embodiment. Polarizing filter 315 removes the state 1 polarized light, and passes through state 2 polarized light only. The polarization modulator 320 in FIG. 3A is "off," leaving the state 2 polarized light to pass through. In this context, the term "on" refers to a setting in which the polarization modulator 320 rotates the polarization of light, while the term "off" refers to the setting in which the polarization modulator 320 does not alter the polarization of light.

OPLE 325 reflects state 1 polarized light, while passing through state 2 polarized light. Here, state 2 polarized light is transmitted straight through (having the shorter light path.) The output in one embodiment is transmitted to near eye display (NED) projection optics 330. Of course, though it is not shown, additional optical elements may be included in this system, including lenses, correction systems, etc.

FIG. 3B is a diagram of the digital light path length modulator of FIG. 3A with the polarization modulator "on." Here, again, the polarizing filter passes only state 2 polarized light. However, here, the polarization modulator 320 modulates the light, and outputs state 1 polarized light. The state 1 polarized light is reflected within the OPLE 325. Thus, this light goes through a longer light path. FIG. 3B illustrates two possible methods of reflection. One reflects on the polarization sensitive reflective elements, with the light exiting at a different location. The other bounces the light within the OPLE, prior to exiting, at the same location.

A comparison of FIGS. 3A and 3B, shows that the state 1 polarized light has a longer light path than the state 2 polarized light. In this way, a digital light path length modulator 340 can change the light path length. While only a single digital light path length modulator 340 is shown here, a plurality of digital light path length modulators 340 may be stacked to provide a larger number of light path lengths.

FIGS. 3A and 3B show a time sequential embodiment, in which all of the light entering the digital light path length modulator 340 has one polarization, and is either modulated or not modulated by polarization modulator 320. In this example, the system switches between the states shown in FIGS. 3A and 3B, in time. The polarization modulator 320 may selectively modulate the polarization of a subset of the light, in one embodiment. In one embodiment, modulation may be based on location, time, color, wavelength, and optionally other differentiable factors.

FIGS. 4A-4D illustrate one embodiment of the light paths in a cross-sectional view of one embodiment of an optical path length extender (OPLE). The OPLE includes an entry surface, coated by a partially reflective coating 420, a quarter wave plate 430, and a wire grid polarizer 440. In this example, the light polarization is defined in the direction of propagation. For example, in one embodiment:

C1 polarization is right handed circular polarization,
C2 polarization is left handed circular polarization,
L1 polarization is s-type linear polarization,
L2 polarization is p-type linear polarization.
Of course these particular polarizations are merely exemplary, and the actual polarizations are two sets of orthogonal polarizations. One of skill in the art would understand that the polarizations may be altered without changing the invention.

Figure 4A:
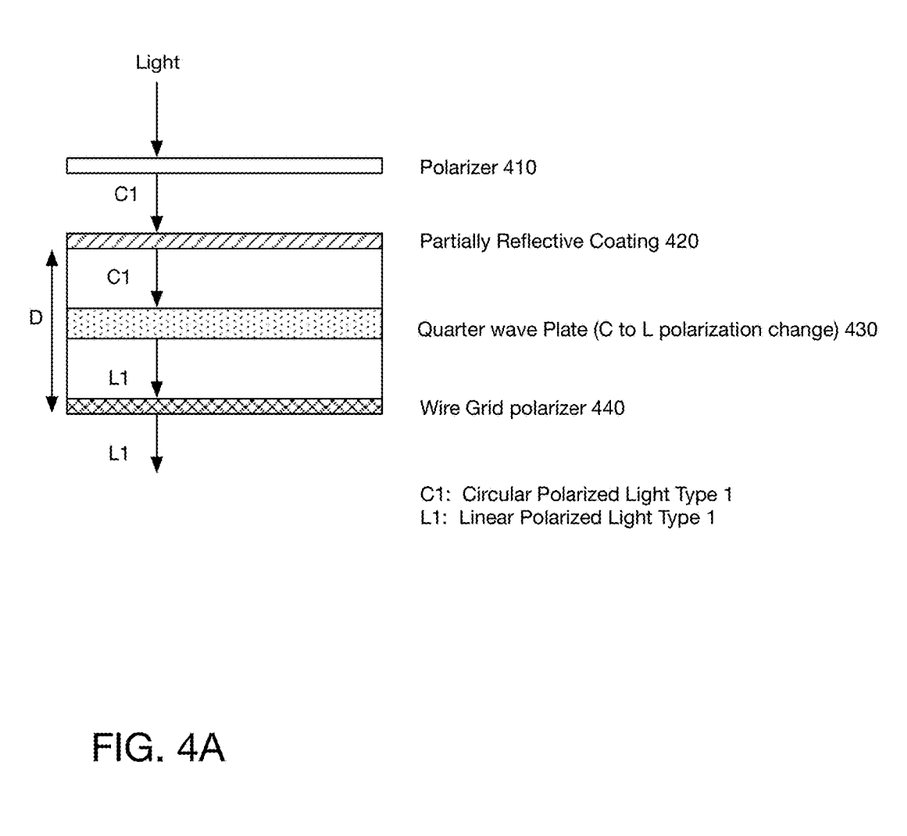
FIGS. 4A-4D illustrate one embodiment of the light paths in a cross-sectional view of one embodiment of an optical path length extender (OPLE).

For light with polarization type two, here C1 (circular polarization type 1), the light passes through the partially reflective coating 420, passes through the quarter wave plate 430, and exits through wire grid polarizer 440. The quarter wave plate 430 alters the C1 polarization to an L1 polarization, so the exiting light is L1 polarized. This may be input to another digital light path length modulator.

Figure 4B:
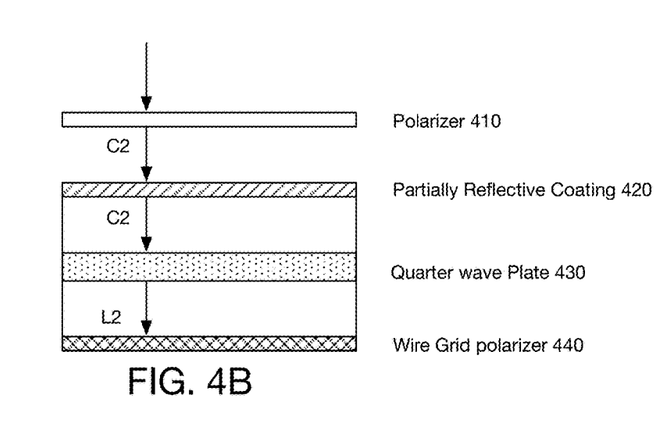
Figure 4C:
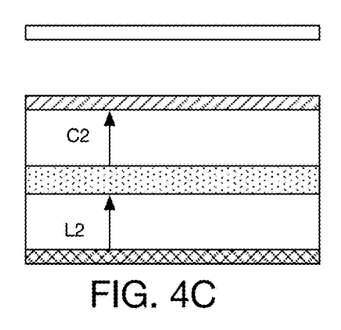
Figure 4D:
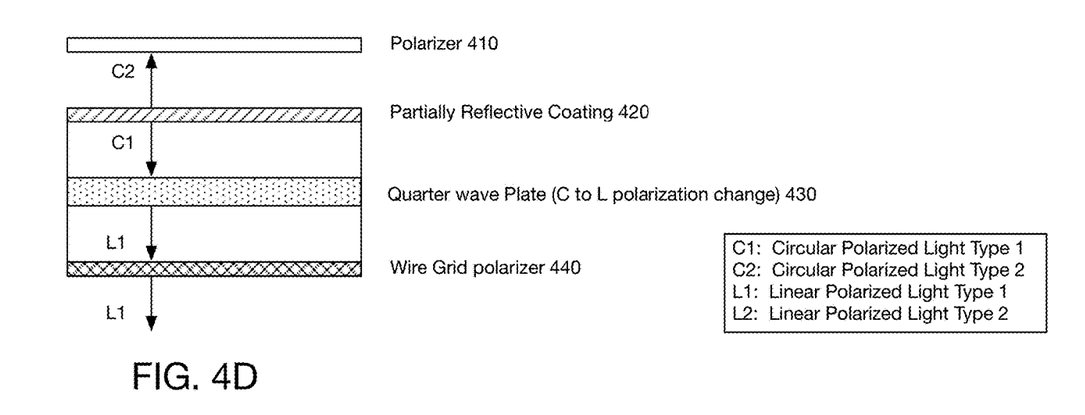

FIG. 4B-4D show the path taken by light with polarization C2 (circular polarization of type 2), as it impacts the OPLE. It is changed to polarization L2 by the quarter wave plate 430. Light with polarization L2 is reflected by the wire grid polarizer 440. FIG. 4C shows the path of the reflected light, returning through the quarter wave plate, which re-converts it to C2 polarization. It then impacts the partially reflective coating 420.

The partially reflective coating 420 reflects a portion of the light, as C1 polarized light, and permits the rest of the light to pass through, as C2 polarized light. The now C1 polarized light passes through the quarter wave plate one more time, before exiting through the wire grid polarizer. Thus, the path of the light entering with the C2 polarization is three times the length of the path of light entering with the C1 polarization, since it reflects back up through the OPLE, and down through the OPLE a second time, before exiting. However, there is no lateral shift of the virtual source during this process.

Figure 5A:
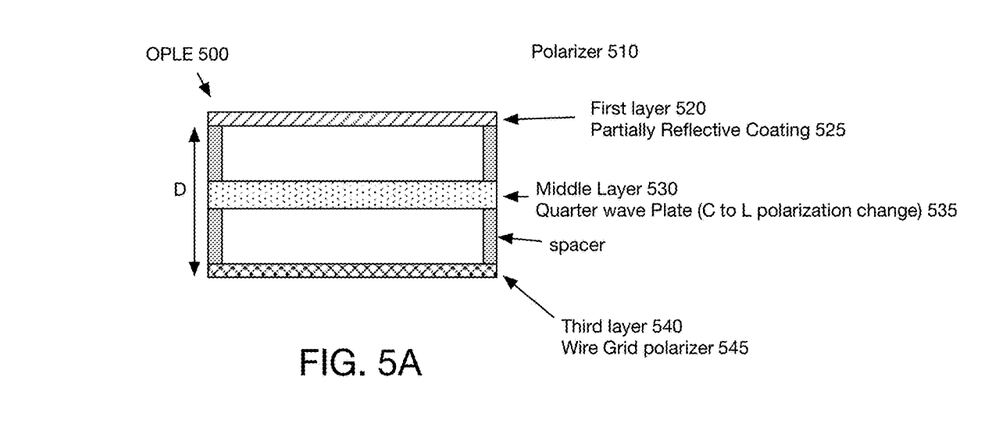
FIG. 5A illustrates another embodiment of an OPLE.

FIG. 5A illustrates another embodiment of an OPLE. OPLE 500 includes a first layer 520 with a partially reflective coating 525, a middle layer 530 comprising a quarter wave plate 535, and a third layer 540 including a wire grid polarizer 545. OPLE 500 in one embodiment utilizes spacers 550 between each of the layers. In another embodiment, the layers may be attached to each other.

The partially reflective coating 525 is applied to a first layer 520. The partial reflective coating 525 is one embodiment a thin layer of a reflective metal or dielectric, in the 50-100 angstrom thickness. In one embodiment, material is aluminum or silver. In one embodiment, partially reflective coating 525 is applied to a bottom of the first layer 520. In one embodiment, the middle layer 530 is entirely made of quarter wave plate 535, or may have a quarter wave plate portion. The quarter wave plate may be mica, or a polymer plastic. There is no limitation on a size of the quarter wave. The bottom layer includes a wire grid polarizer 545, which may be applied to the top of the third layer. Each of the layers is made of a material clear to the type of light that is used with the OPLE. The material may be a glass, plastic, sapphire, or other material. The thickness of the OPLE is selected to optimize the value of the light path lengthening. In one embodiment, the reflective elements may be shaped, rather than flat.

Figure 5B:
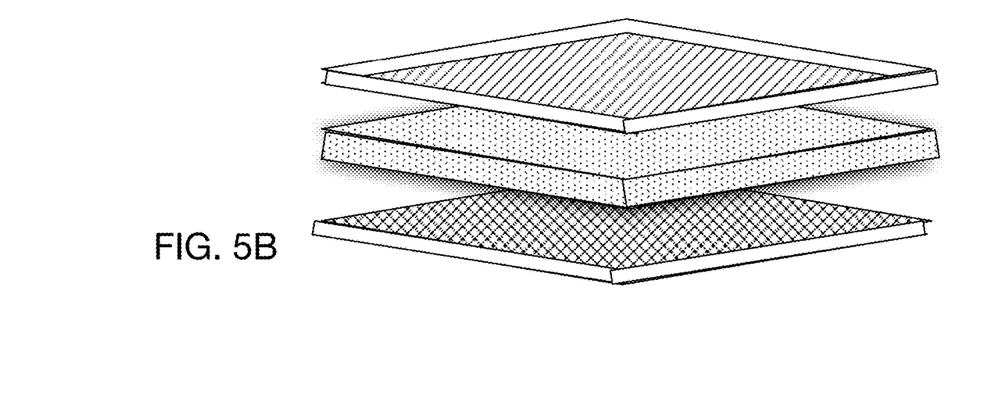
FIG. 5B illustrates a perspective view of one embodiment of the elements of an OPLE.

FIG. 5B illustrates a perspective view of one embodiment of the elements of an OPLE. As can be seen the layers may be separately made and then either attached using spacers, or using intermediate layers of glass or other materials. The height of the OPLE is defined by the size of the layers, including intermediate layers or spacers. The height controls the lengthening of the optical path.

Figure 6:
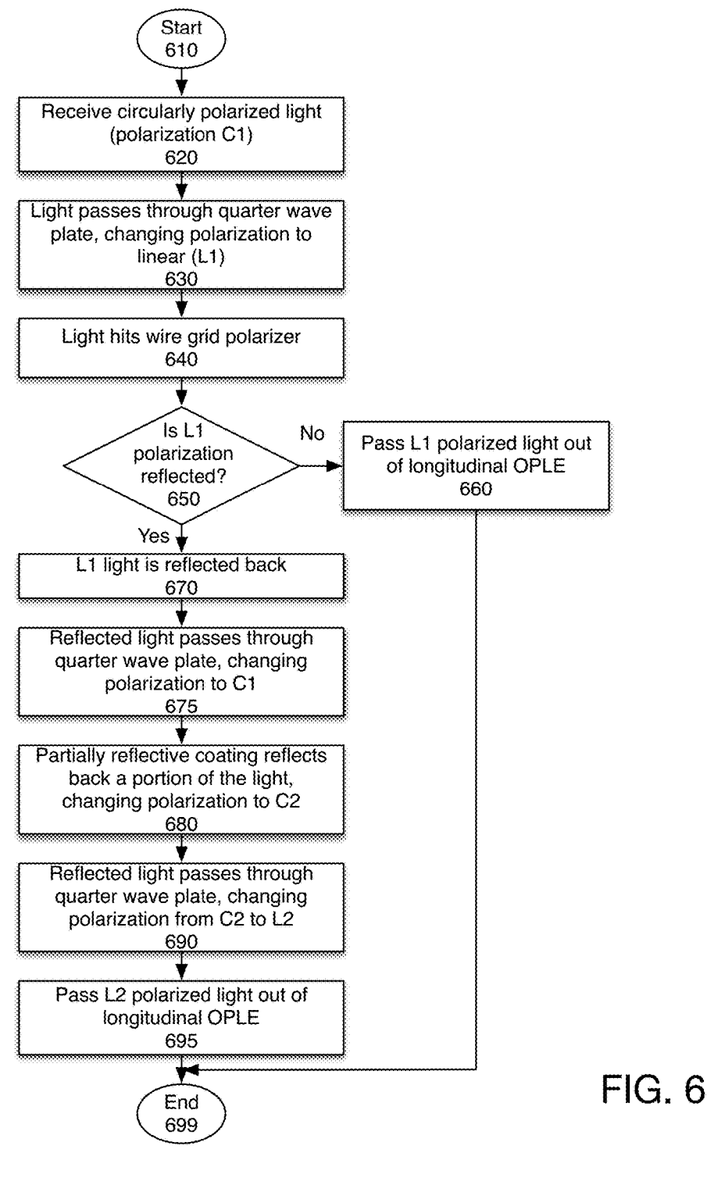
FIG. 6 is a flowchart of light path extension through one embodiment of an OPLE.

FIG. 6 is a flowchart of light path extension through one embodiment of an OPLE. The process starts at block 610. At block 620, circularly polarized light is received, with polarization C1. The light passes through the quarter wave plate, changing polarization to linear (L1). The light hits the wire grid polarizer at block 640.

At block 650, it is determined whether the light of polarization L1 will be reflected by the wire grid polarizer. If the L1 polarized light is not reflected, at block 660 the L1 polarized light is passed through the wire grid polarizer, and exits the longitudinal OPLE.

If the L1 polarization is reflected, as determined at block 650, at block 670 the light is reflected back through the OPLE. At block 675, the reflected light passes through the quarter wave plate again, changing the polarization from the L1 to C1.

At block 680, the partially reflective coating reflects back a portion of the light. The reflected portion of the light changes polarization to C2. The twice reflected light passes through the quarter wave plate again, changing the polarization from C2 to L2.

At block 695, the L2 polarized light passes out of the longitudinal OPLE. The process then ends.

Figure 7:
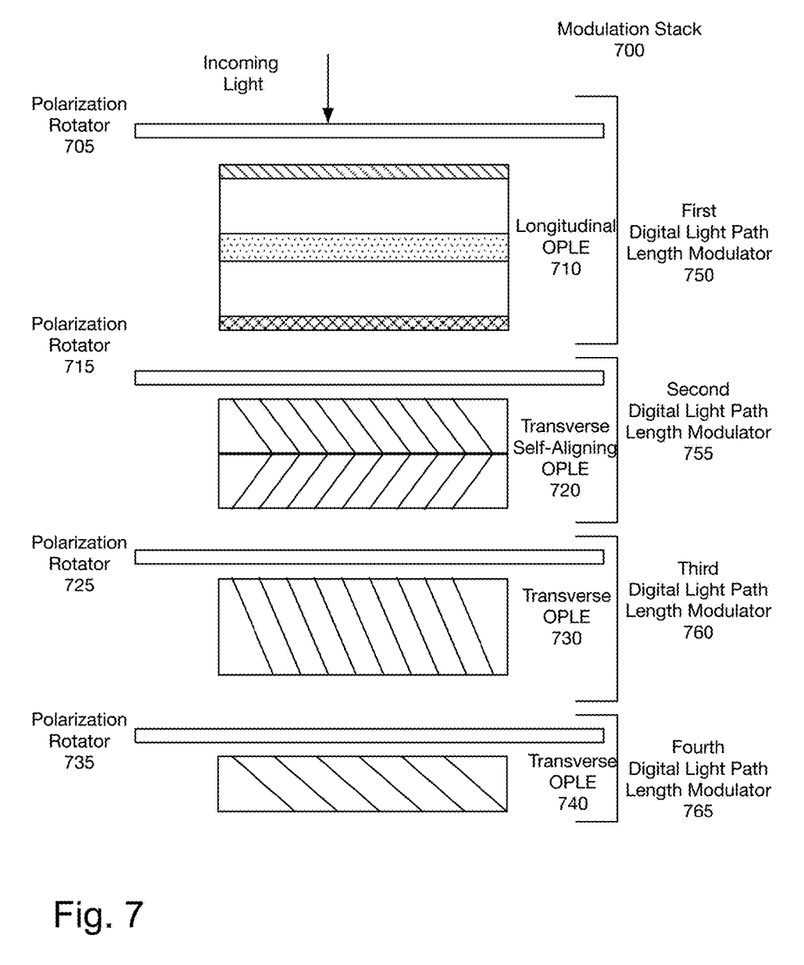
FIG. 7 is one embodiment of a modulation stack including a plurality of OPLEs.

FIG. 7 is one embodiment of a modulation stack including a plurality of OPLEs. The modulation stack includes four digital light path length modulators. Each of the digital light path length modulators 750, 755, 760, 765 includes a polarization modulator and an OPLE. In this example, the first OPLE 710 is a longitudinal OPLE, while the other OPLEs are transverse OPLEs. One of the transverse OPLEs 720 is a self-aligned OPLE.

In various embodiments, one or more of the following variations may be made: the effective thickness of the OPLEs may vary, as may the angles of the polarization sensitive reflective elements, and the OPLE may include one, two, or more plates. The effective thickness of the OPLE is defined as the cumulative thickness of the plates which are parts of the OPLE. Thus the effective thickness of OPLE 720 is different than the thickness of OPLE 740, even though the individual plates in the two OPLEs 720, 740 are identical.

With the shown set of four different OPLEs, the system can create up to sixteen, $2^4$ focal lengths by selectively modulating the polarization, as follows:

| OPLE 1 | OPLE 2 | OPLE 3 | OPLE 4 |
|--------|--------|--------|--------|
| State 1 | State 1 | State 1 | State 1 |
| State 1 | State 1 | State 1 | State 2 |
| State 1 | State 1 | State 2 | State 1 |
| State 1 | State 1 | State 2 | State 2 |
| State 1 | State 2 | State 1 | State 1 |
| State 1 | State 2 | State 1 | State 2 |
| State 1 | State 2 | State 2 | State 1 |
| State 1 | State 2 | State 2 | State 2 |
| State 2 | State 1 | State 1 | State 1 |
| State 2 | State 1 | State 1 | State 2 |
| State 2 | State 1 | State 2 | State 1 |
| State 2 | State 1 | State 2 | State 2 |
| State 2 | State 2 | State 1 | State 1 |
| State 2 | State 2 | State 1 | State 2 |
| State 2 | State 2 | State 2 | State 1 |
| State 2 | State 2 | State 2 | State 2 |

In one embodiment, because the light exits from both sides of a longitudinal OPLE, the longitudinal OPLE 710 is preferentially a first OPLE in a modulation stack 700 that includes longitudinal OPLEs. In one embodiment, the number of longitudinal OPLEs 710 is limited by the level of light loss for each longitudinal OPLE.

Figure 8:
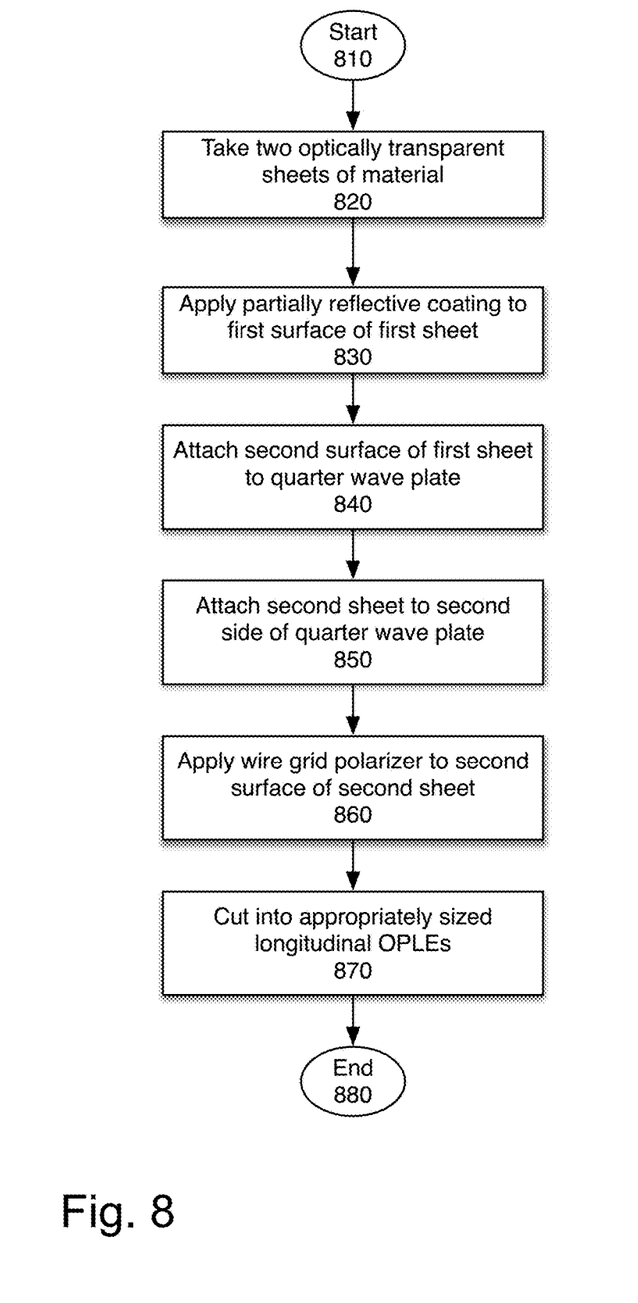
FIG. 8 is a flowchart of one embodiment of manufacturing an OPLE.

FIG. 8 is a flowchart of one embodiment of manufacturing a longitudinal OPLE. The process starts at block 810.

At block 820, two optically transparent sheets of material are used. In one embodiment, the sheet is made of glass. Alternatively, another material that is optically clear to the wavelengths of the system, such as plastic, transparent ceramic, silicon, sapphire, or other materials, may be used.

At block 830, a partially reflective coating is applied to the first surface of the first sheet. In one embodiment, this first surface is the "top" surface of the sheet, which will form the entry surface of the OPLE.

At block 840, the second surface of the first sheet is attached to the quarter wave plate. In one embodiment the adhesive used is optically clear glue. In one embodiment, the substrates may be attached via spacers, in which the substrates are spaced apart using a support structure, rather than adhered or otherwise directly attached. Other methods of securing substrates together may be used. The quarter wave plate is made of a birefringent material, for which the index of refraction is different for different orientations of light passing through it. The quarter wave plate may be a bulk material, such as mica, quartz, calcite, or plastic. The quarter wave plate may be a film applied to an optically clear material. The quarter wave plate converts circularly polarized light into linear polarized light, and vice versa.

At block 850, the second sheet is attached to the other side of the quarter wave plate. The quarter wave plate is now sandwiched between the two transparent sheets of material. The attachment may be via adhesive, spacers, or other methods.

At block 860, the wire grid polarizer is applied to the second surface of the second sheet. This is the exit surface, in one embodiment.

At block 870, the resulting material is cut into appropriately sized longitudinal OPLEs. The process then ends.

Although this is illustrated as a flowchart, one of skill in the art would understand that the steps need not be taken in the order shown. For example, the wire grid polarizer may be applied to the optically transparent material at any time, before or after the second sheet is integrated into the OPLE structure. Similarly, the partially reflective coating may be applied at any time.

The process shown produces consistent longitudinal OPLEs. These longitudinal OPLEs can be used to lengthen the light path, which may be controlled by digitally modulating the polarization of the light impacting the OPLE. The OPLE and the digital light path length modulator is easily and consistently manufactured, and takes up very little space.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A system to adjust light path length comprising a digital light path length modulator, the digital light path length modulator comprising:
    a polarization modulator to receive polarized light and to modulate a polarization of some or all of the polarized light; and
    an optical path length extender (OPLE) having an entry surface and an exit surface, to direct the light entering the OPLE with a first polarization through the entry surface and along a first light path through the OPLE to exit through the exit surface, and to direct the light entering the OPLE with a second polarization through the entry surface and along a second light path through the OPLE to exit through the exit surface, the second light path through the OPLE having a light path length two or more times longer than the first light path length through the OPLE;
    wherein the OPLE is a longitudinal OPLE, and the light entering the OPLE with the second polarization is reflected back towards the entry surface, prior to exiting the OPLE through the exit surface.

2. The system of claim 1, wherein the longitudinal OPLE comprises:
    a quarter wave plate, changing a type of polarization between a circular polarization and a linear polarization, such that the light entering the OPLE has circular polarization, and the light exiting the OPLE has linear polarization.

3. The system of claim 1, wherein the longitudinal OPLE includes:
    a quarter wave plate to change the polarization of the light between a circular polarization and a linear polarization;
    a wire grid polarizer to pass the light having a particular polarization through, and to reflect the light with a different polarization; and
    a partially reflective coating to reflect a portion of the light, reversing the circular polarization of the light, such that the reflected light is passed through the wire grid polarizer to exit the OPLE.

4. The system of claim 3, wherein the partially reflective coating is on the entry surface of the longitudinal OPLE, the quarter wave plate is in a center of the OPLE, and the wire grid polarizer is on the exit surface of the longitudinal OPLE.

5. The system of claim 1, wherein the first light path traverses the longitudinal OPLE one time, and the second light path traverses the longitudinal OPLE three times, reflecting off a wire grid polarizer and a partially reflective coating, such that a second light path length through the longitudinal OPLE is a multiple of the first light path length.

6. The system of claim 1, wherein the polarization of the light entering the OPLE is a circular polarization, and the light with the second polarization is converted between the circular polarization and a linear polarization multiple times.

7. The system of claim 1, further comprising:
    a second digital light path length modulator, the second digital light path length modulator comprising:
        a second polarization modulator, to receive the polarized light exiting from the OPLE, and to modulate the polarization of some or all of the polarized light; and
        a second OPLE to further alter relative light path lengths;
    thereby creating a plurality of digitally selectable path lengths.

8. The system of claim 7, wherein the second OPLE is not a longitudinal OPLE.

9. The system of claim 1, wherein the longitudinal OPLE includes:
    a quarter wave plate to change the polarization of the light between a circular polarization and a linear polarization;
    a wire grid polarizer to pass the light having a particular polarization through, and to reflect the light with a different polarization; and
    a partially reflective coating to reflect a portion of the light, reversing the circular polarization of the light, such that the reflected light is passed through the wire grid polarizer to exit the OPLE.

10. The system of claim 9, wherein the partially reflective coating is on the entry surface of the longitudinal OPLE, the quarter wave plate between the entry surface and the exit surface of the OPLE, and the wire grid polarizer is on the exit surface of the longitudinal OPLE.

11. A system comprising:
    an optical path length extender (OPLE) having two light paths having different path lengths, such that light entering the OPLE with a first polarization is directed through a first light path, and light entering the OPLE with a second polarization is directed through a second light path having a light path length two or more times longer than the first light path length through the OPLE,
    wherein the OPLE is a longitudinal OPLE in which the light entering the OPLE with the first polarization passes through the OPLE and exits through an exit surface of the OPLE, and the light entering the OPLE with the second polarization is reflected back through the OPLE prior to exiting through the exit surface of the OPLE.

12. The system of claim 11, wherein the light entering the OPLE with the second polarization passes through the OPLE three times prior to exiting through the exit surface.

13. The system of claim 11, wherein:
the light entering the OPLE with the second polarization is converted to a third polarization,
the light with the third polarization is reflected back from a wire grid polarizer,
the light with the third polarization is converted to the second polarization,
the light with the second polarization is reflected back from a partially reflective surface thereby being converted to the first polarization, and
the light converted to the first polarization passes through the OPLE through the first light path.

14. The system of claim 11, further comprising:
a quarter wave plate to convert the light with the first polarization to a third polarization, and the light with the second polarization to a fourth polarization.

15. The system of claim 11, further comprising:
a partially reflective layer to reflect light;
a quarter wave plate to change polarization between circular polarization and linear polarization; and
a wire grid polarizer, to reflect light with the second polarization and pass light with the first polarization.

16. The system of claim 15, wherein the light entering the OPLE has a circular polarization, and the light exiting the OPLE has a linear polarization.

17. The system of claim 16, wherein a first reflection is from the wire grid polarizer, and a second reflection is from the partially reflective layer.

18. The system of claim 15, wherein the partially reflective coating is on the entry surface of the longitudinal OPLE, the quarter wave plate is between the entry surface and the exit surface of the OPLE, and the wire grid polarizer is on the exit surface of the longitudinal OPLE.

19. The system of claim 11, further comprising:
a second digital light path length modulator, the second digital light path length modulator comprising:
a second polarization modulator, to receive the polarized light exiting from the OPLE, and to modulate the polarization of some or all of the polarized light; and
a second OPLE to further alter relative light path lengths;
thereby creating a plurality of digitally selectable path lengths.

* * * * *